United States Patent
Horton et al.

(10) Patent No.: US 7,426,458 B2
(45) Date of Patent: Sep. 16, 2008

(54) NUCLEAR REACTOR RELOAD LICENSING ANALYSIS SYSTEM AND METHOD

(75) Inventors: Charles E. Horton, Wilmington, NC (US); James E. Fawks, Wilmington, NC (US); Carter Couser Tarrer, Wilmington, NC (US); Gary D. Galloway, Wilmington, NC (US)

(73) Assignee: Global Nuclear Fuel - Americas, LLC, Wilmington, NC (US)

( * ) Notice: Subject to any disclaimer, the term of this patent is extended or adjusted under 35 U.S.C. 154(b) by 375 days.

(21) Appl. No.: 11/027,580

(22) Filed: Dec. 30, 2004

(65) Prior Publication Data

US 2006/0149515 A1 Jul. 6, 2006

(51) Int. Cl.
*G06G 7/48* (2006.01)

(52) U.S. Cl. .......................... 703/6; 376/245
(58) Field of Classification Search ............. 703/6; 376/245, 246, 217, 219, 210
See application file for complete search history.

(56) References Cited

U.S. PATENT DOCUMENTS

| | | | |
|---|---|---|---|
| 5,490,185 A | 2/1996 | Dent et al. | |
| 5,793,636 A | 8/1998 | Cooney et al. | |
| 5,923,717 A | 7/1999 | Fawks, Jr. | |
| 5,960,051 A | 9/1999 | Challberg et al. | |
| 6,338,149 B1 | 1/2002 | Ciccone, Jr. et al. | |
| 6,504,889 B1 | 1/2003 | Narita et al. | |
| 6,674,825 B2 | 1/2004 | Bolger et al. | |
| 6,697,447 B1 * | 2/2004 | Casillas et al. | 376/245 |
| 6,721,383 B2 | 4/2004 | Casillas et al. | |
| 2004/0013220 A1 | 1/2004 | Casillas et al. | |
| 2004/0071253 A1 | 4/2004 | McFetridge | |
| 2004/0236544 A1 | 11/2004 | Russel, II et al. | |

OTHER PUBLICATIONS

Nissan et al., E. An Integrated Symbolic and Neural Network Archtecture for Machine Learning in the Domain of Nluclear Engineering, International Conference on Pattern Recognition, vol. 2, Oct. 1994, pp. 494-6.*

* cited by examiner

*Primary Examiner*—Russell Frejd
(74) *Attorney, Agent, or Firm*—Harness, Dickey & Pierce, PLC

(57) ABSTRACT

A system and computer implemented method for automatically performing reload licensing analysis of a nuclear reactor and preparing and generating a reload licensing report. The system and method include collecting input data and processing a plurality of nuclear reactor analysis modules. Each of the nuclear reactor analysis modules receives analysis module input data and generates analysis output data. The analysis module input data is based at least in part on the collected input data. The method also includes verifying at least one analysis output data from one nuclear reactor analysis module by comparing the analysis output data to predetermined analysis output data for the one nuclear reactor analysis module. The method further includes generating a reload licensing report for the nuclear reactor as a function of the analysis output data from two or more nuclear reactor analysis modules.

23 Claims, 11 Drawing Sheets

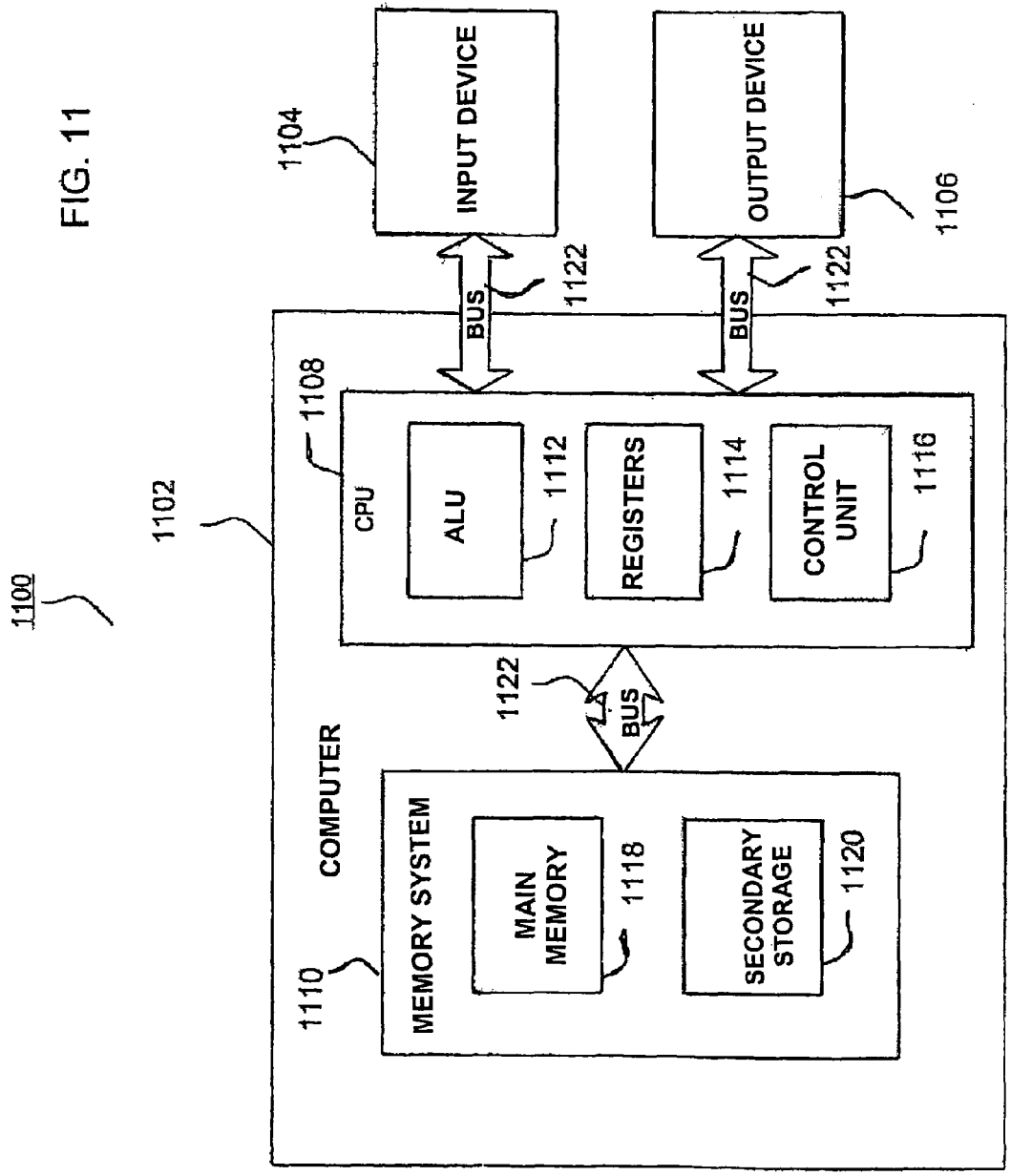

NUCLEAR REACTOR RELOAD LICENSING ANALYSIS SYSTEM AND METHOD

FIELD OF THE INVENTION

The present invention relates to nuclear reactors, and more specifically, relates to automated analysis for the reloading of a nuclear reactor.

BACKGROUND OF THE INVENTION

Nuclear power plants are typically operated and maintained by operators in cooperation with their supplier or vendors and are managed under strict rules and regulations issued by the Nuclear Regulatory Commission (NRC) within the Department of Energy (DOE). One such example is a Boiling Water Reactor (BWR) wherein water passing through the reactor is heated by the energy released from nuclear reactions emanating enriched uranium fuel rods placed within the reactor core, creating steam vapor directly in the reactor core. As the enriched fuel within these nuclear fuel rods is expended over time, the nuclear power plant must be periodically shutdown to replace or reload the spent fuel rods with fresh fuel rods, and properly store the discharged spent radioactive fuel rods.

In preparation for the refueling operation, nuclear reactor operators must perform NRC-defined safety and licensing on the reconfigured nuclear reactor fuel loading and submit the results of these analyses as a formal report to the NRC, thereby adhering to the NRC's Reload License Analysis (RLA) requirements. These reports are submitted on standard forms and include projections of the expected operation of the current fuel loading as well as operational projections for the power plant after the fuel rods are replaced in the reconfigured core loading. Upon review of the submitted RLA analyses and their approval by the NRC, a license can be issued to the operator to proceed with the scheduled refueling operation and to bring the reactor back into operation.

The Reload License Analysis (RLA) requires plant operating and engineering personnel to sequentially perform a series of assessments, data collection and analyses that document historical, current and projected future plant operating conditions as well as key expected performance results. After each analysis package or module is run its results must be verified. The assessments and analyses include establishing ranges of acceptable inputs and outputs for various parameters and comparing analysis results to these acceptable data ranges. Currently, the systems and methods utilized for reload licensing require a substantial investment in time and engineering resources and result long RLA lead-times for the reactor operator; all of which are costly and restrictive for operation of a nuclear reactor.

SUMMARY OF THE INVENTION

The inventors of the various embodiments of the present invention have designed and developed a system and method for automated reload licensing analysis and report generation for a nuclear reactor, such as a Boiling Water Reactor (BWR). Various embodiments of the system and method provide for the technical effect of reductions in the time and resources required to perform a reload licensing analysis thereby reducing the time and expense of reloading nuclear fuel into a reactor. Additionally, some embodiments can provide one or more technical effects related to improved accuracy and effectiveness of the analysis, the output data, and the reload licensing report which can also provide for reduced reactor outage time and enhanced reactor safety.

According to one aspect of the invention, a computer-implemented method in a computing environment automatically performs a reload licensing analysis of a nuclear reactor. The method includes collecting input data and processing a plurality of nuclear reactor analysis modules. Each of the nuclear reactor analysis modules receives analysis module input data and generates analysis output data. The analysis module input data is based at least in part on the collected input data. The method also includes verifying at least one analysis output data from one nuclear reactor analysis module by comparing the analysis output data to predetermined analysis output data for the one nuclear reactor analysis module. The method further includes generating a reload licensing report for the nuclear reactor as a function of the analysis output data from two or more nuclear reactor analysis modules.

According to another aspect of the invention, a system for automatically performing reload licensing analysis of a nuclear reactor includes a processor, at least one memory device storing at least one database, and a software program. The software program includes an input data collection module, an input data verification module, a plurality of nuclear reactor analysis modules, and a process module. The input data collection module is adapted for receiving input data. The input data collection module with a user data interface sub-module adapted for receiving operator input and a system data collection sub-module being adapted for collecting data from one or more data sources. The input data verification module is adapted for comparing the received input data to predefined input verification data. The process module is adapted for processing each of the nuclear reactor analysis modules and generating module output data. The process module includes a process ordering sub-module adapted for initiating automatic processing of each reactor analysis module.

According to yet another aspect of the invention, a computer readable medium is adapted to perform computer executable instructions of a method of automated reload licensing analysis of a nuclear reactor. The method includes collecting system input data, and scheduling a plurality of nuclear reactor analysis modules. The method also includes processing each of the nuclear reactor analysis modules as a function of the scheduling. Each of the nuclear reactor analysis modules receives module input data and generates module output data. The method further includes verifying the module output data of each nuclear reactor analysis module by comparing the generated analysis output data to predetermined analysis output data for the particular nuclear reactor analysis module. At least a portion of the nuclear reactor analysis modules receives verified module output data from another nuclear reactor analysis module as module input data. The method includes generating a reload licensing report for the nuclear reactor as a function of the verified module output data from the two or more nuclear reactor analysis modules.

Further aspects of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The exemplary embodiments of the present invention will become more fully understood from the detailed description given herein below and the accompanying drawings, wherein like corresponding parts are represented by like reference numerals throughout the several views of the drawings, which are given by way of illustration only and thus are not limiting of the exemplary embodiments of the present invention.

FIG. 11 is a block diagram of a computer system that can be used to implement a method and/or system for automatic processing of a reload licensing analysis for a nuclear reactor according to another exemplary embodiment of the invention.

DETAILED DESCRIPTION

The following description is merely exemplary in nature and is in no way intended to limit the invention, its applications, or uses.

Various embodiments of the invention relate to a system and/or method that can be implemented in software, in a computer readable medium form that includes computer executable instructions, for performing automated reload licensing analyses. The method includes, but is not limited to, automatically accessing historical process data contained in one or more databases, modeling individual unit processes, defining acceptable ranges (e.g., minimum and maximum values) for benchmarked process input/output parameters, verifying data measurements as an integral part of the automated analyses and generating an output report that can be submitted to the NRC as part of the refueling application. Some embodiments of this method and system are referred herein to as the technical analysis process integration tool (TAPIT), by way of example.

For example, in some exemplary embodiments of a computing environment, a computer implemented method automatically performs a reload licensing analysis of a nuclear reactor. The method includes collecting input data and processing a plurality of nuclear reactor analysis modules or functions. Each of the nuclear reactor analysis modules or functions receives analysis module input data and generates analysis output data. The analysis module input data is based at least in part on the collected input data. The method also includes verifying at least one analysis output data from one nuclear reactor analysis module by comparing the analysis output data to predetermined analysis output data for the one nuclear reactor analysis module. The method further includes generating a reload licensing report for the nuclear reactor as a function of the analysis output data from two or more nuclear reactor analysis modules.

Figure 1:
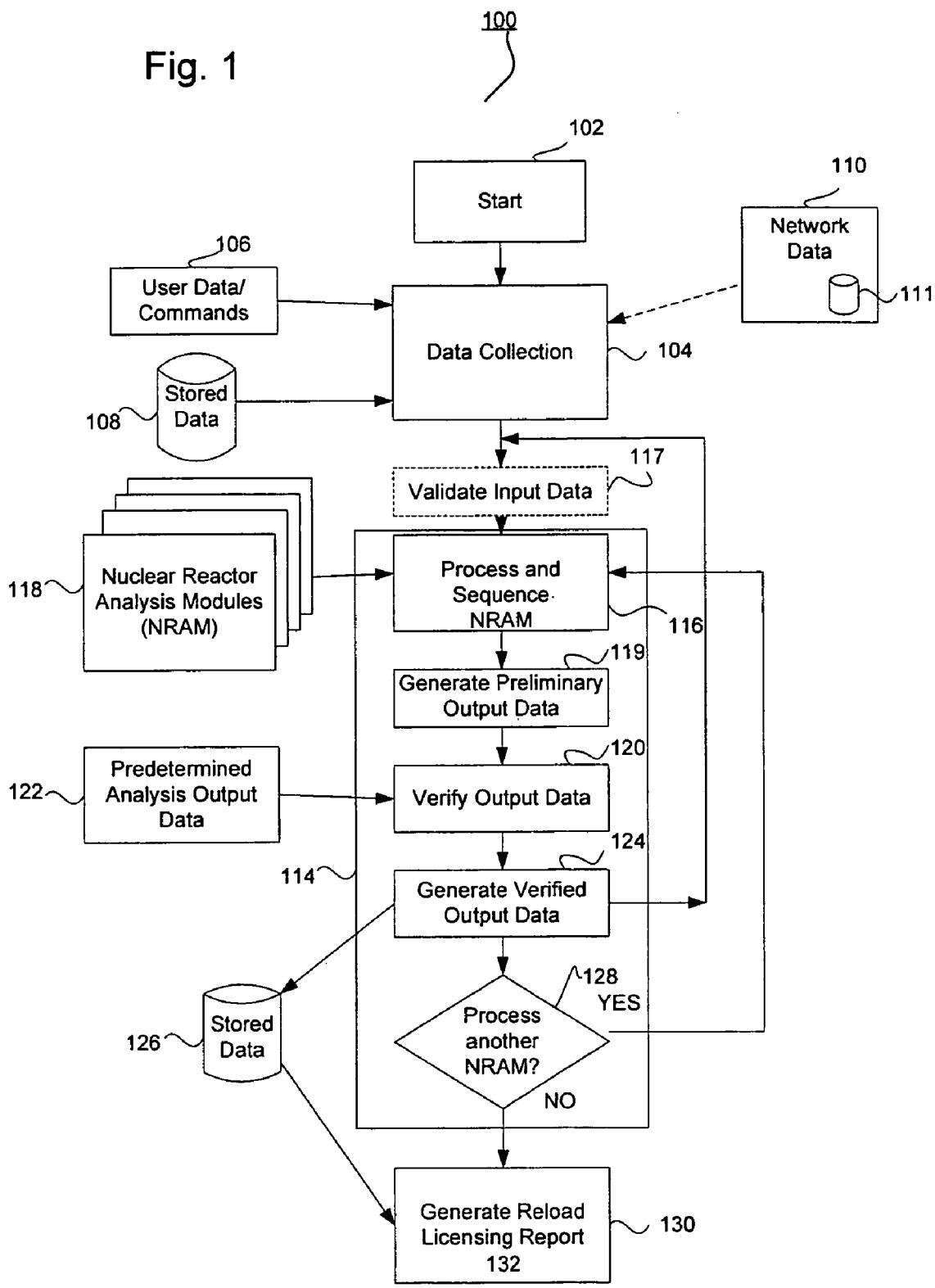
FIG. 1 is a flow diagram illustrating a method of automatically performing reload licensing analysis of a nuclear reactor according to one exemplary embodiment of the invention.

FIG. 1 is a flow chart of one exemplary embodiment of a method 100 for performing automated processes and analysis for a reload licensing analysis and report generation. The method starts at 102 and data is collected in process 104 from one or more data sources. In this example, data sources can include user input data 106, data stored in one or more memories or data bases 108, and/or network data 110 obtained from a network connection 112 such as an internet, local area network (LAN), or public network. User input can be obtained from a user interface that can include color core maps, a configuration management interface, and a restart. In one embodiment, the user interface is a web or hypertext mark-up language (HTML) user interface.

Typically, the network data 110 is stored remotely in one or more networked memory or storage devices 111. In some embodiments, the input data collected as user data 106, stored data 108, or network data 110 can also be verified to ensure the integrity of the collected data in process 104. The collected data 106, 108, and/or 110 can include system data collected from a data source selected from the group consisting of a database file, a spreadsheet file, a stored data text file, and a reactor operator database file. These databases can be a proprietary database or file, a CEDAR database, an Oracle® database (Oracle is a U.S. registered trademark of Oracle Corporation), an Access® (Access is a U.S. registered trademark of Microsoft Corporation) database, an Excel® (Excel is a registered trademark of Microsoft Corporation) spreadsheet, a stored spreadsheet, stored text, or a built in function, value, etc. This data can include fuel reload licensing engineering data (FRED), plant transient specification data, plant operating data, fuel bundle data, mechanical data, nuclear data, thermal-hydraulic data, preliminary core design data, and general plant data, by way of example.

Once the data collection of process 104 is complete, the analysis process 114 begins. In some embodiments, processing in 114 can be initiated by input or a command from a user 106. The process of 114 provides a governing and directing function to the various analyses and processes of method 100. A plurality of nuclear reactor analysis modules (NRAM) 118, such as software programs or subroutines, by way of example, are processed by process and sequence process 116. This process can be by any means, and can include in some embodiments processing driven by a set of or plurality of instructions. In some embodiments, the processes for the plurality of nuclear reactor analysis modules 118 are automatic and do not require further user interaction or involvement. And in one preferred embodiment, no additional user interaction or involvement or input is allowed, except possibly as an escape or override to terminate or suspend the automated processing.

The nuclear reactor analysis modules 118 can include one or more sub-modules, such as a nuclear design basis sub-module (NDB), a reload core coolant hydraulics sub-module, a reference loading pattern (RLP) sub-module, safety limit minimum critical power ratio sub-module (SLMCPR), a reload transient analysis (RTA) sub-module, a rod withdrawal error (RWE) sub-module, loss of feedwater heating (LFWH) sub-module, a mislocated fuel loading error (MFLE) sub-module, a stability analysis sub-module, and an emergency core coolant system conformance limit analysis (ECCS LOCA) sub-module. Additionally, other analysis modules 118 can also be included and some of the identified nuclear reactor analysis modules 118 can be omitted and one or more nuclear reactor analysis modules 118 can be combined or sub-divided.

Additionally, an operating limit minimum critical power ratio (OLMCPR) (not shown) can be generated by one or more nuclear reactor analysis modules 118 or a separate or unique module 118 as a function of outputs generated by the RTA, RWE, LFWF, MFLE, ECCS LOCA and stability analysis modules. In one such embodiment, the reload licensing report is generated, at least in part, as a function of the operating limit minimum critical power ratio (OLMCPR).

Each nuclear reactor analysis module 118 receives module-specific input data as required by the particular analysis module. Module input data can include a portion of the collected data and can include verified output module data that has been generated from a previously processed nuclear reactor analysis module 118. In some embodiments, each nuclear reactor analysis module 118 can also include an input data verification process 117 or module to ensure the validity of the module input data for proper analysis module 118 processing. Such validity can be checked using any of a variety of data validity processes and data. The input data verification process 117 can be performed as a function within each nuclear reactor analysis module 118 or as a separate and distinct analysis module 118.

Each of the plurality of nuclear reactor analysis modules 118 is scheduled for sequential or simultaneous processing. Each nuclear reactor analysis module 118 generates preliminary output data 119 that is verified in 120, for example by comparing the preliminary output data 118 to predetermined analysis output data 122. The predetermined analysis output data 122 can be generated based on theoretical determinations, modeling, or based on prior experiences. The verification process in 120 and the predetermined output data 122 can include consistency checks with previously obtained information, checking for reasonableness, and checking for conformance to design criteria. The output data verification function 120 can be performed as a function within each nuclear reactor analysis module 118 or as one or more separate and distinct functional modules 118.

Once the output data is verified in process 120, the verified output data 124 for each analysis module 118 is stored in a memory in 126 and provided to one or more other nuclear reactor analysis modules 118 as module input data. The processes within process module 114 continue sequentially or simultaneously until each of the desired or required nuclear reactor analysis modules 118 have been processed and their output data verified which is checked in process 128. Once all nuclear reactor analysis modules 118 have been processed, a reload licensing report 132 is generated in process 130. The reload licensing report 132 is based on two or more verified module output data 124 from two or more analysis modules 118. The module outputs or reload licensing report 132 can be in any format and can be formatted to graphics format such as a ".pdf" file or filed in a storage or memory device.

As noted, additional modules or sub-modules can also be included in the system and process. This includes, by way of example, a process history module for storing data associated with the processing of the nuclear reactor analysis modules by the process module, or a design and licensing criteria verification data module that includes at least one of nuclear reactor analysis options, nuclear reactor operator operational goals, objectives, and criteria, and nuclear reactor design requirements.

Figure 2:
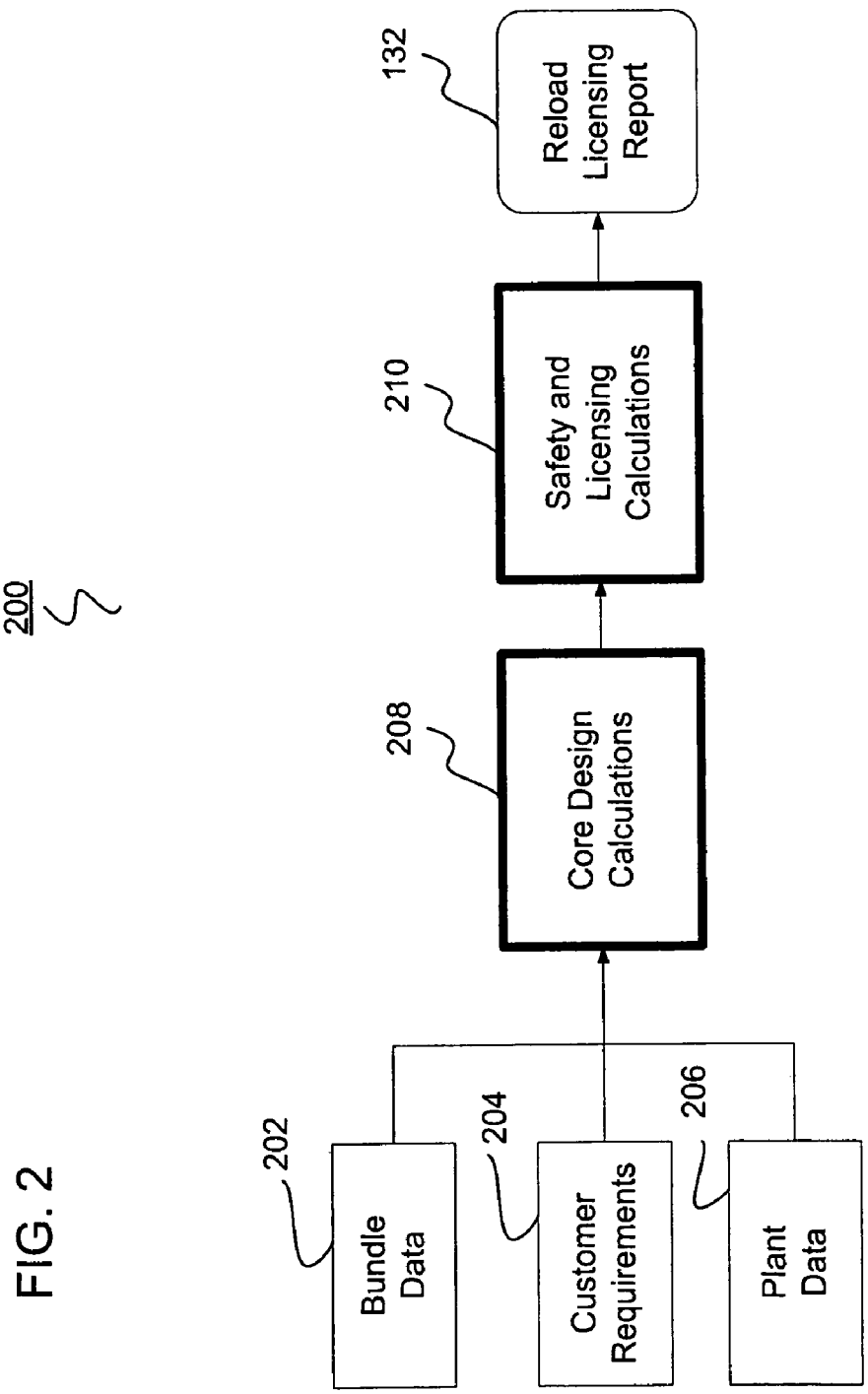
FIG. 2 is a block diagram of a system and method for automatically generating a reload licensing report according to another exemplary embodiment of the invention.

Referring now to FIG. 2, an automated reload licensing analysis system and method 200 receives input such as reactor bundle data 202, operator requirements 204 and reactor plant data 206. From this input data, core design calculations are generated in 208. Once complete, safety and licensing calculations are made in 210 and a reload licensing report 132 is generated as a function of the core design calculations 208 and the safety and licensing calculations 210.

Figure 3:
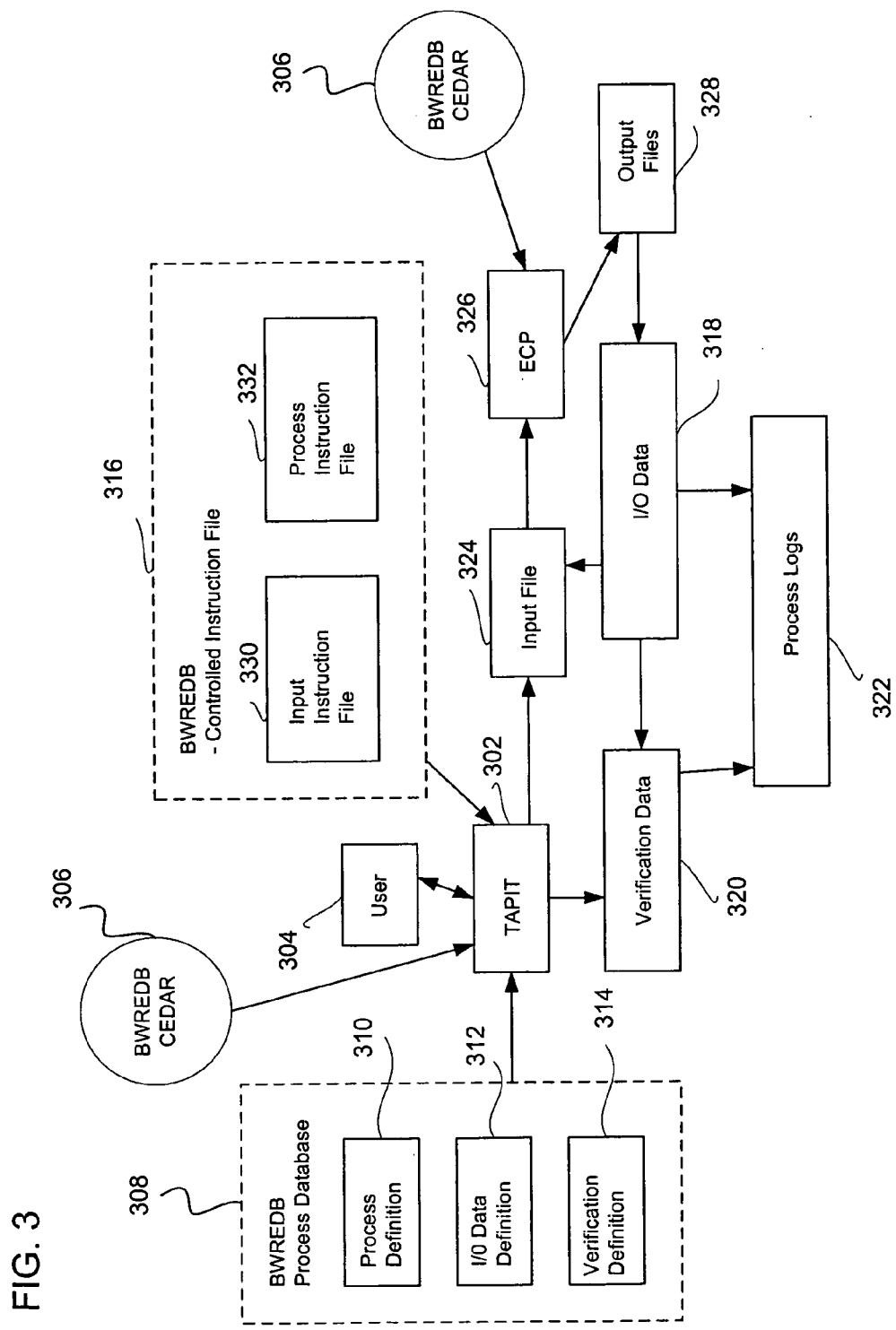
FIG. 3 is a block diagram of data storage and flows for automatically performing reload licensing analysis of a nuclear reactor according to another exemplary embodiment of the invention.

Referring now to FIG. 3, a block diagram illustrates data storage and flows for a system and method of automatically performing reload licensing analysis of a nuclear reactor 300 according to various exemplary embodiments of the invention is illustrated. In this exemplary embodiment, a technical analysis process integration tool (TAPIT) 302 includes many, if not all, of the functions and processes as described above and throughout this description. The TAPIT 302 receives data input from a plurality of data sources. As shown, the boiling water reactor engineering data base (BWREDB) includes a process database portion 308. In one exemplary embodiment, the BWREDB is implemented in an Oracle® (Oracle is a U.S. registered trademark of Oracle Corporation) database. In such an embodiment, the database defines the reload licensing analysis processes, including all of the input collecting, input and run file creation, processing, output collection, and verification. Additionally, the database (or instructions defined therein or elsewhere) can specify the scheduling of the processes to be sequential or simultaneous, or any combination thereof, for each of the analysis processes or modules. However, other database systems and software are also within the scope of the invention.

As shown, the BWREDB Process Database 308 can provide TAPIT 302 with a process definition 310, an input/output definition 312, and a verification definition 314. Each of these provides one or more definitions for data related to the nuclear reactor. A BWREDB controlled instruction file 316 can provide the TAPIT 302 with input instruction files 330 and/or process instruction files 332. Each of these provides one or more definitions for data related to the nuclear reactor. The CEDAR boiling water reactor engineering data base (BWREDB) can also provide data to be collected by the TAPIT 302. CEDAR is an example of a database developed by General Electric Company for use in this regard. However, other databases may also be utilized. A user 304 can also input data directly or indirectly into the TAPIT 302. Additionally, input/output data 318 is exchanged and collected by the TAPIT 302.

The TAPIT 302 provides output data to the Verification Data process 320 which also receives input/output data 318 to generate, at least in part, process logs 322. The input file 324 also receives input/output data 318 and executes one or more engineering computer programs (ECP) 326 as a function thereof. The ECP 326 also receives BWREDB CEDAR 306 input and generates output files 328.

Figure 4:
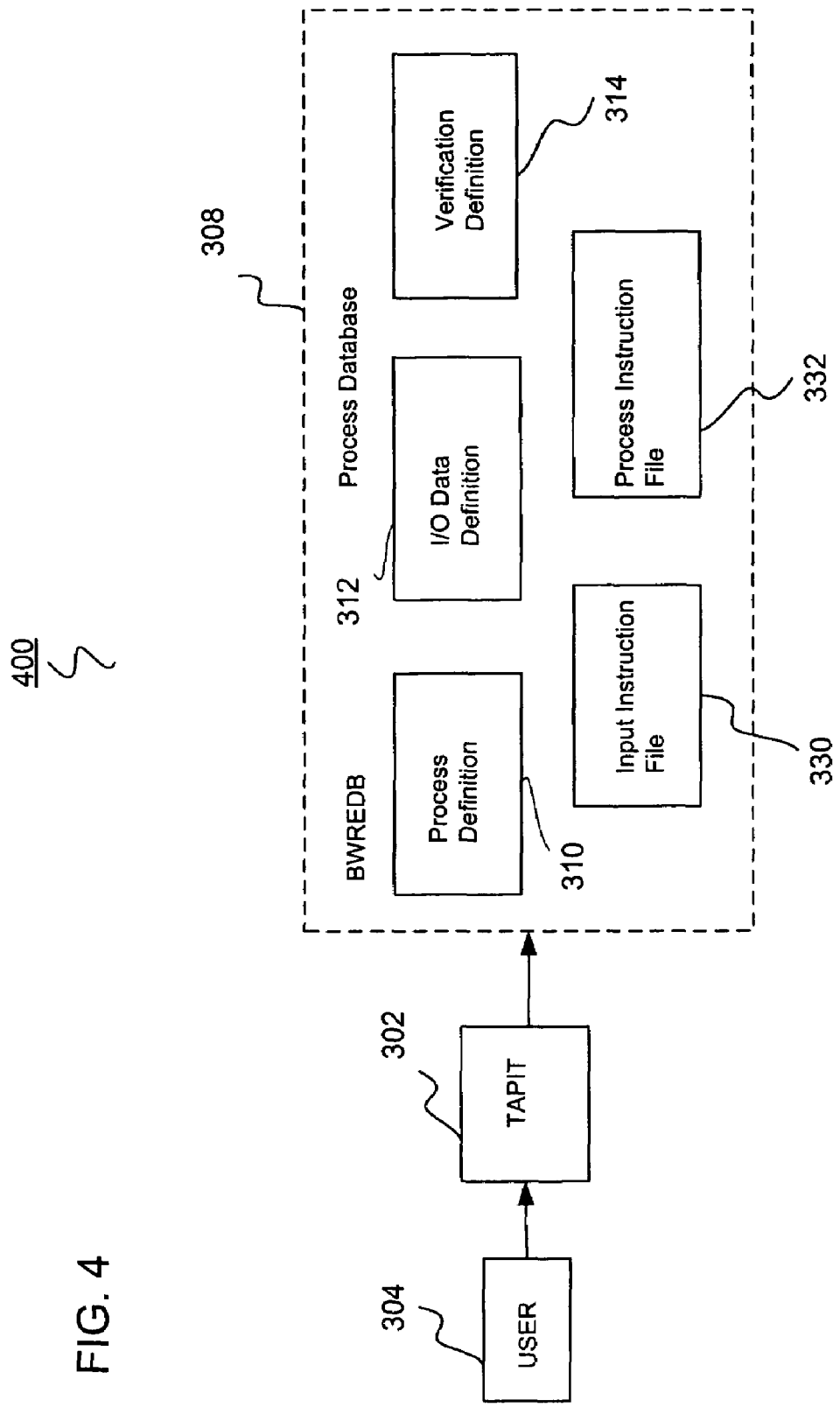
FIG. 4 is a block diagram of a process flow for generating a boiling water reactor engineering data base according to another exemplary embodiment of the invention.

Referring now to FIG. 4, a process flow 400 illustrates one embodiment of providing output data from the TAPIT to the BWREDB Process Database 308. The user 304 can provide input data or commands to the TAPIT 302 which in turn generates output data as a result of processing one or more nuclear reactor licensing analysis modules or processes. These are received by the BWREDB Process Database 308 and one or more of the sub-modules therein. This can include the process definition 310, the input/output data definition 312, the verification definition 314, the input instruction file 330, and the process instruction file 332.

Figure 5:
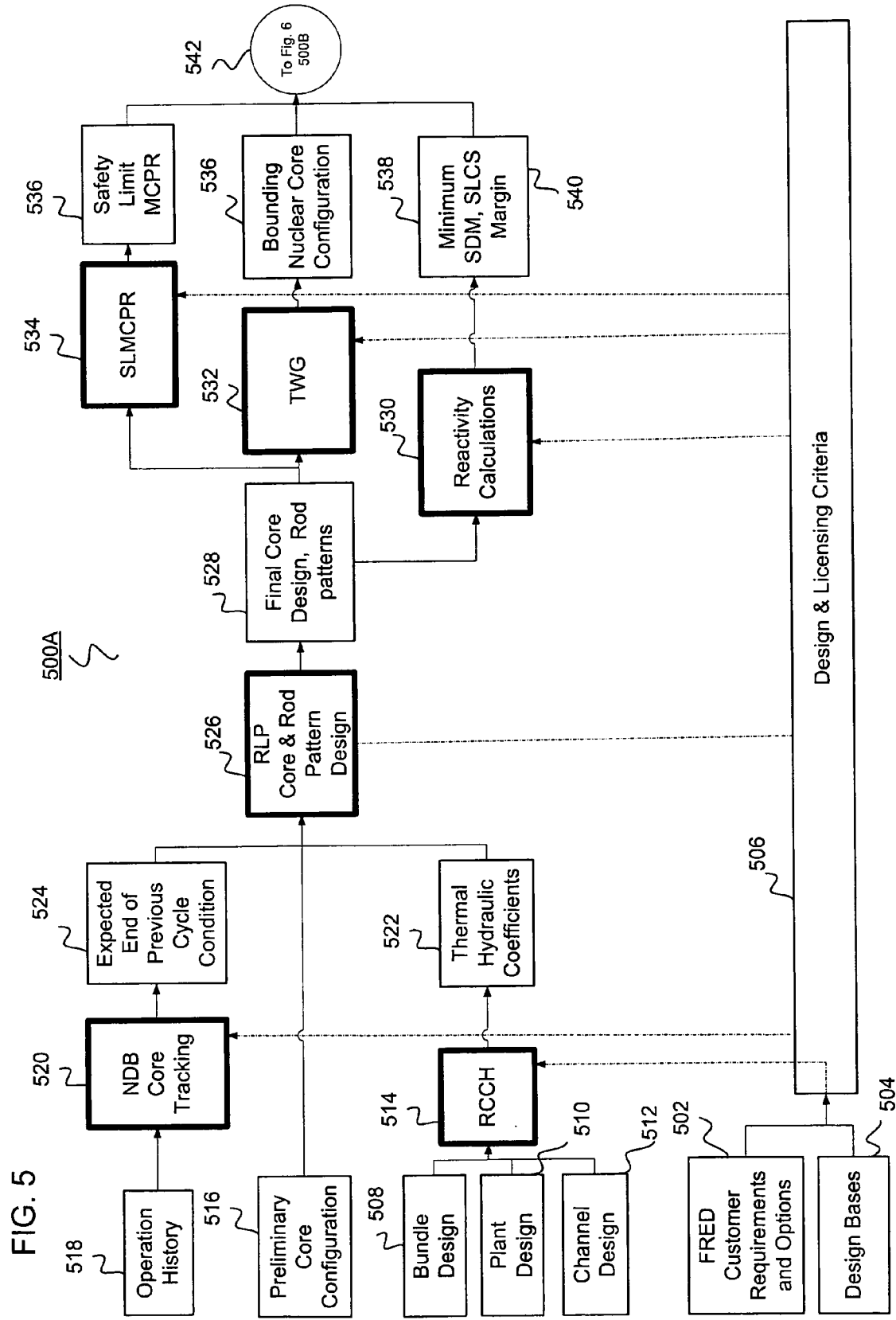
FIG. 5 is a first part of a block diagram of a system and modules for performing an automated reload licensing analysis of a nuclear reactor according to another exemplary embodiment of the invention.
Figure 6:
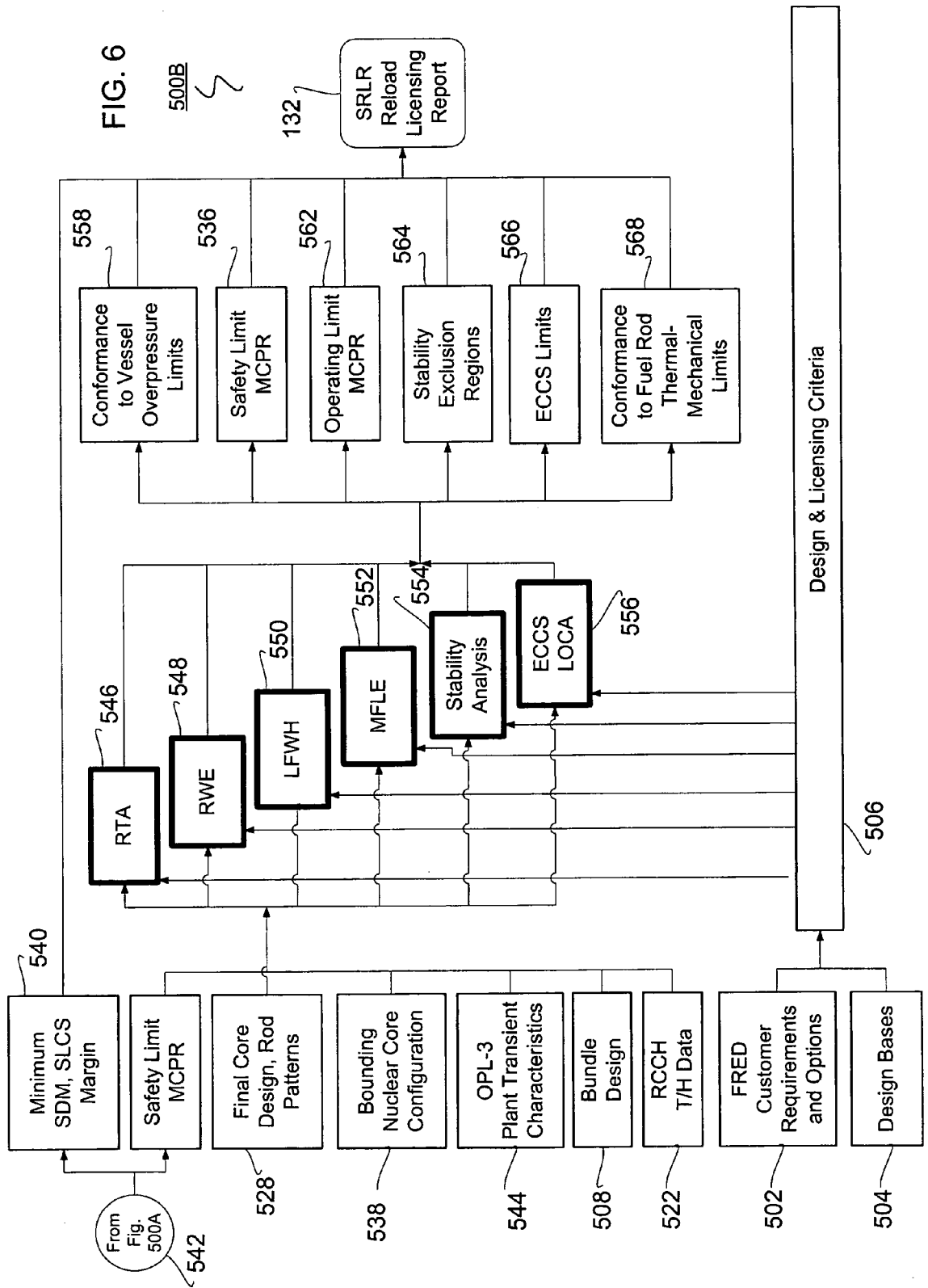
FIG. 6 is a second part of a block diagram of a system and modules for performing an automated reload licensing analysis of a nuclear reactor according to another exemplary embodiment of the invention.

The reload licensing analyses for nuclear reactors, such as domestic Boiling Water Reactors (BWRs), by way of example, and those non-domestic reactors that utilize US type licensing methodology are performed in accordance with U.S. NRC licensing agreements as defined in GESTAR-II, by way of example. FIGS. 5 and 6, and the associated discussion below, provide a brief description of some exemplary analytical modules and processes that can be included in an automated reload licensing analysis system and method according to one or more embodiments of the invention. FIGS. 5 and 6 illustrate, a first part 500A and a second part 500B, respectively, of a system, software or process flow modules for performing an automated reload licensing analysis of a nuclear reactor according to another exemplary embodiment of the invention. The first part 500A and second part 500B are connected flows connected by connectors 542 and 544, respectively.

Various input sources can be accessed during the performance of the reload licensing analyses according to some embodiments of the current invention. These can include determining, collecting and identifying reactor operator requirements. In one embodiment, these reactor operator requirements are collected and populated into a report or database or file, sometimes known as a Fuel Reload-Licensing Engineering Data (FRED) 502 report or file. Also plant transient related specifications and/or operating plant data (OPL-3) 510 and 544 (in FIG. 6), and fuel bundle mechanical, nuclear and thermal-hydraulic data 508 can be collected from various sources. Other data provided and received by the system and method include general plant description information 510, preliminary core design 516, operation history 518, bundle design 508, channel design 512, thermal-hydraulic data 522, a plant transient specification 544, and a design bases 504.

The fuel reload-licensing engineering data (FRED) 502 can be an input to the reload licensing process. The FRED data 502 however can be generated from prior activities and data accumulation and collection, by way of example, through interaction between a power plant supplier or vendor and the utility organization. Generation of the FRED data 502 can be performed in order to establish the reactor operator requirements to be incorporated into the reload licensing analysis. This task is completed before any of the analytical processes commence. The FRED data 502 can consist of the key operator requirements, options and design criteria under which the reload licensing analysis is to be performed.

Similarly, the operating parameters for licensing (OPL) data 544 is typically input data to the reload licensing system and process. The OPL data 544 is generally compiled from data resulting from an interaction between various entities, such as the engineering consulting firm, and reactor operator. The OPL data 544 includes values of parameters needed for the Reload Transient Analysis (RTA) 546, including reactor operator references/comments on the source and use of these values. The OPL 544 data can include a mutually agreed upon basis for the parameters for RTA 546 analysis. As such, OPL 544 is one of the many data collected by the system and used as an input to the automated procedures of the licensing analysis system.

A general description of the various analysis processes, modules, or sub-modules will now be described. It should be noted that some of the specified tasks may be performed in parallel or simultaneously with or even prior to some of the tasks described earlier or as illustrated, as this is only one exemplary embodiment of the invention in this regard.

The reload core coolant hydraulics (RCCH) analysis or sub-module 514 is an analysis process performed to provide key thermal-hydraulic parameters required in the subsequent reload licensing tasks. The inputs to this process are obtained from the FRED 502, the fuel inventory for the design cycle, the plant description and the fuel mechanical and thermal-hydraulic description. The RCCH analysis 514 output includes the thermal-hydraulic description of the core including the pressure drop loss coefficients, bypass flow characteristics (the fraction of the core flow in-between the bundle channels), and key plant heat balance characteristics.

The nuclear design basis (NDB) analysis or sub-module 520 provides a representation of the previous cycle core operation as well as the key design criteria needed for the reload licensing activity. Inputs to this activity include the core operating history 518 (core tracking) and the projected operating history for the remainder of the cycle. The NDB analysis 520 output includes an expected end-of-previous cycle condition 524 and key design bases (critical eigenvalues, expected core operating limits) under which the design is to be performed.

The reference loading pattern (RLP) analysis or sub-module 526 obtains a final design core loading 528 which serves as the reference loading upon which all the licensing analyses are based. The RLP analysis 526 determines the fuel to be discharged at the end of the previous cycle, the fresh fuel to be inserted and the final core configuration for the design cycle. Included in the core design 528 is a set of design (or nominal) control rod patterns for operation through the reload cycle. The reload licensing reactivity conformance checks [one-rod-out shutdown margin (SDM) and standby liquid control system (SLCS) shutdown margin] are also performed as part of the RLP 526. Inputs to this activity include the FRED data 502, RCCH data 514 and the NDB data 520 and 524. Further inputs to RLP include fuel lattice and bundle nuclear, thermal hydraulic and mechanical parameters. Output from RLP 526 includes the design core loading, the design rod patterns, and the SDM and SLCS conformance check results.

The safety limit minimum critical power ratio (SLMCPR) analysis or sub-module 534 determines the cycle-specific minimum critical power ratio (MCPR) safety limit 536. This is the MCPR limit that the core needs to remain above after the most limiting anticipated operational occurrence (AOO) in order for the fuel to stay out of boiling transition. Input to the SLMCPR analysis 534 includes the RLP core design and rod depletion 528, the RCCH data 514, and rod-by-rod power data for the fuel types in the reactor core. Output from the SLMCPR analysis 534 includes the safety limit MCPR 536 that the design cycle will need to adhere to and from which the MCPR operating limit (OLMCPR) will be determined.

The transient wrap-up generation (TWG) analysis or sub-module 532 provides nuclear inputs to the anticipated operational occurrence (AOO) analyses that will reasonably bound the range of expected operation of the design cycle. Input to the TWG analysis 532 includes the RLP core design 528. The nominal RLP rod pattern depletion is modified to establish two end-of-cycle points that are more bounding than the nominal depletion (one case over-depleting the bottom of the core, the other case under-depleting). The output is a collection of nuclear inputs based on both of the bounding approximations of expected operation.

The rod withdrawal error (RWE) analysis or sub-module 548 assures that an inadvertent control rod withdrawal will not result in any fuel violating the MCPR safety limit 536 nor fuel duty limits. Inputs to the RWE analysis 548 include the RLP design rod patterns 528 from which the RWE transient is simulated. Outputs include the change in core minimum critical power ratio, e.g., ΔCPR, due to the RWE transient, which is used along with the other anticipated operational occurrences (AOO) to establish the OLMCPR 562.

The loss of feedwater heating (LFWH) analysis or sub-module 550 assures that an anticipated operational occurrence (AOO) transient caused by a decrease in the reactor feedwater temperature will not result in any fuel violating the SLMCPR or fuel duty limits. The LFWH analysis 550 output includes the change in the critical power ratio, e.g., ΔCPR, of the LFWH event, which is used along with the other anticipated operational occurrences (AOO) to establish the OLMCPR.

The mislocated fuel loading error (MFLE) analysis or sub-module 552 assures that a bundle that is accidentally loaded in an incorrect location will not result in any fuel violating the SLMCPR 536 or fuel duty limits. Inputs to the MFLE analysis 552 include the RLP design rod patterns 528 from which the transient is simulated. Output from this analysis includes the change in the critical power ratio, e.g., ΔCPR, of the MFLE event, which is used along with the other anticipated operational occurrences (AOO) to establish the OLMCPR 562.

The reload transient analysis (RTA) analysis or sub-module 546 establishes the OLMCPR 562 for pressurization transient anticipated operational occurrences (AOO), such that any such transient during the reloading cycle will not result in a minimum MCPR lower than the SLMCPR 536. The RTA analysis 546 confirms compliance with fuel duty requirements and with required vessel over-pressure limits 558. Inputs to the RTA analysis 546 include the Transient Wrap-up Generation 532 nuclear information and RCCH 514 thermal-hydraulic data 522. The RTA analysis 546 outputs include the change in the critical power ratios, e.g., ΔCPRs, of the pressurization events, which are used along with the other AOOs to establish the OLMCPR 562. The results of this analysis generally determine the OLMCPR 562 of the plant during the reloading cycle.

The stability analysis or sub-module 554 assures that the reactor will perform in a safe, non-oscillatory manner (in regards to reactor power and flow) across the entire allowable operating power and flow region. A number of long-term stability options have been developed by a power plant supplier such as General Electric Co. together with the nuclear reactor operators or operators group, such as the BWR Owners Group, to satisfy regulatory requirements, by way of example. The particular option to be analyzed is specified in the FRED data 502. Inputs to this analysis include the Transient Wrap-up Generation 532, nuclear information 538 and RCCH 514 thermal-hydraulic data 522. Outputs from this analysis can typically be either the change in the critical power ratio, e.g., ΔCPR, associated with stability related oscillations, which are used along with the other anticipated operational occurrences (AOO) to establish the OLMCPR 562 or, alternatively, a defined power and flow region from which reactor operation is excluded. The type of output is determined by the stability option selected for the stability analysis 554 by the user or in the collected data.

The emergency core coolant system (ECCS) analysis or sub-module 556 satisfies the requirements on the fuel rod peak clad temperature (PCT), and clad oxidation under a Loss-of-Coolant Accident (LOCA) condition. The ECCS analysis 556 can be performed whenever a new fuel bundle design is to be used in the reload. Inputs include the fuel bundle mechanical 508, nuclear and thermal-hydraulic description and the reactor ECCS design parameters (not shown). Output from the analysis includes a set of maximum allowable nodal power limits, or maximum average planar linear heat generation rate limits (MAPLHGRs), for each fuel bundle design in the reactor core.

Once the reload licensing analyses are complete, a supplemental reload licensing report (SRLR) 132 that documents the results of the reload licensing analysis is produced as a function of one or more of the above identified analyses, sub-modules, data, and/or functions. In one exemplary embodiment, each and every one of the aforementioned analyses or sub-modules and data serve as input to the SRLR 132. The SRLR 132 can include a document or file whose content and format can conform to any specified or desired content and format. The SRLR 132 can include a document or file with content and format conforming to requirements specified in a licensing agreement, for example, the GESTAR-II licensing agreement.

Figure 7:
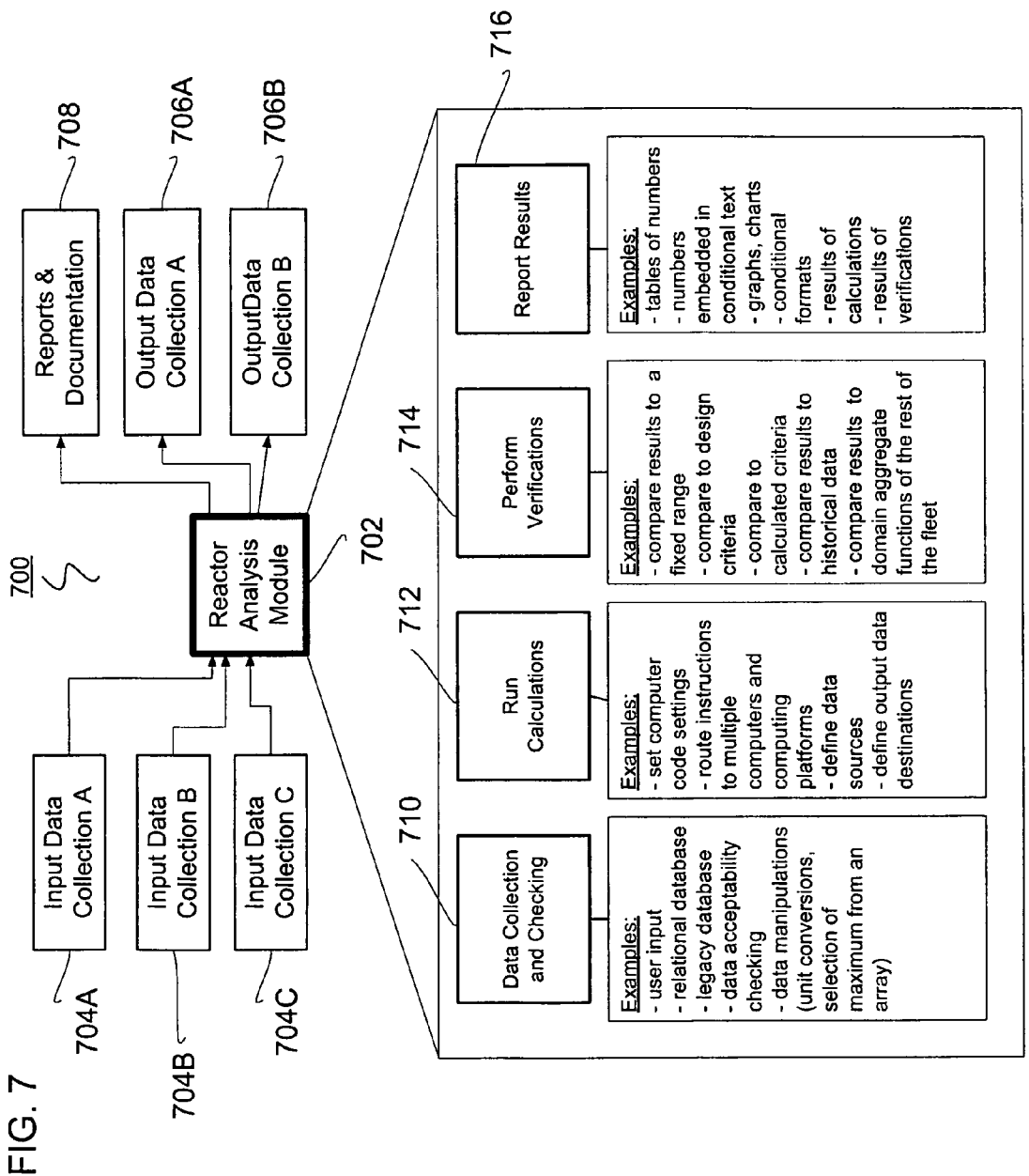
FIG. 7 is a block diagram of a generic reactor analysis module according to another exemplary embodiment of the invention.

While each of the analysis modules or sub-modules have been generally described with regard to their functions, inputs, and outputs, FIG. 7 provides one detailed exemplary embodiment of a generic reactor analysis module or sub-module 700. In this example, reactor analysis module 702 receives a plurality of inputs 704A-C and provides a plurality of outputs 706A-B. Additionally, reactor analysis module 702 generates or provides reports and/or documentation 708. Internal to the operation of the reactor analysis module 702, there can be a plurality of operations such as a data collection and checking operation 710, a run calculations operation 712, and perform verifications operation 714, and a report results operation 716. Examples of each of these are illustrated in FIG. 7. It should be noted, as described in FIG. 7, the input data verification and output data verification can be defined processes or function with each reactor analysis module 118. In other embodiments, one or both of these functions cam be performed in separate analysis modules or combined to support one or more nuclear reactor analysis modules 118.

Figure 8:
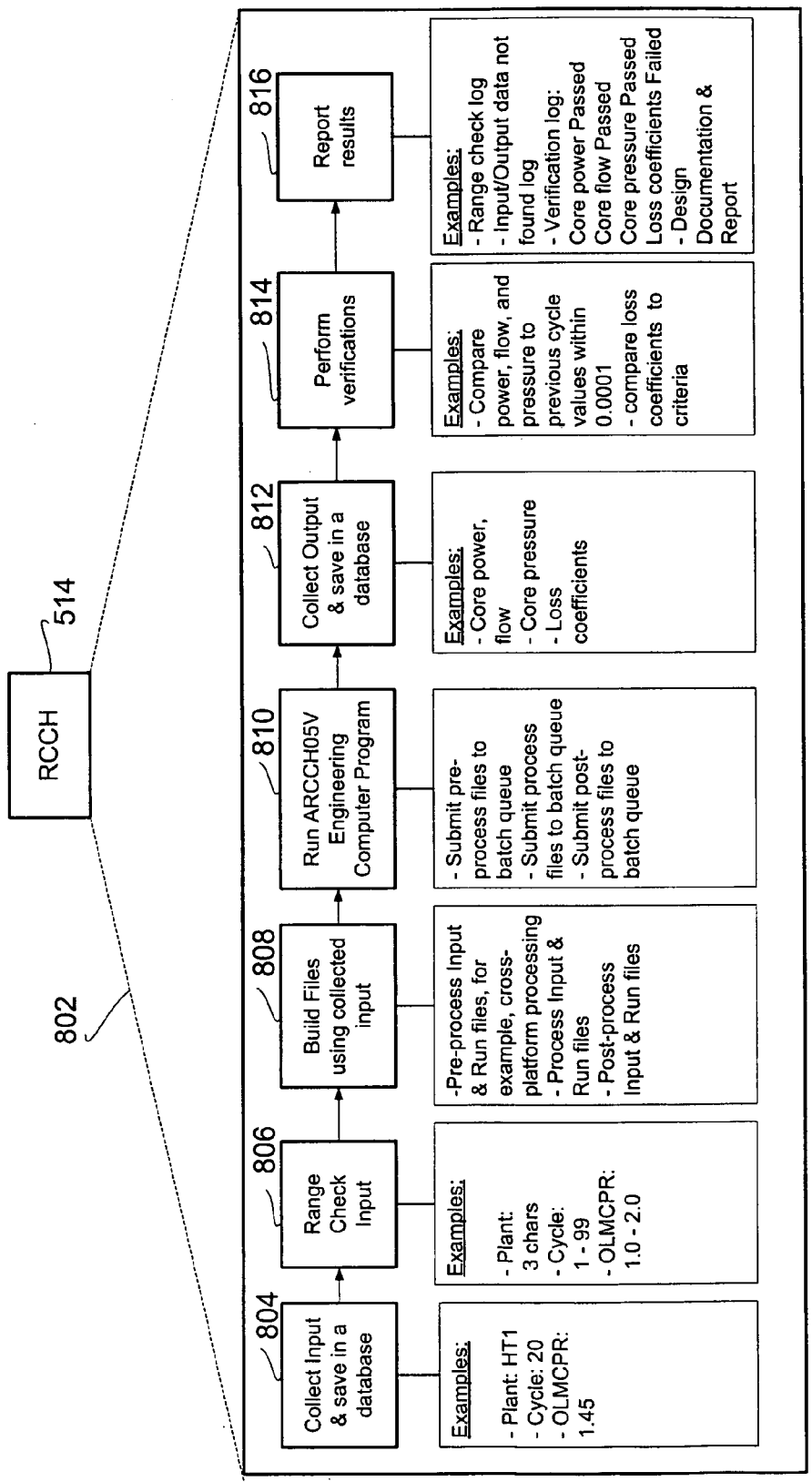
FIG. 8 is a block diagram of a reload core coolant hydraulics (RCCH) module according to another exemplary embodiment of the invention.

The operation of an analysis module can be further illustrated by way of one example. FIG. 8 illustrates a block diagram break out 800 of a reload core coolant hydraulics (RCCH) module 514 or process according to one embodiment of that illustrated in FIG. 7. The RCCH module 514 is expanded by expansion 802 to illustrate one embodiment of various internal processes. This include a collect input and save process 804, a range check input process 806, a build files process 808, a run engineering computer program (ECP) process 810, a collect output and save process 812, an output verification process 814, and a reporting or generating verified output data process 816. Examples of each of these are illustrated in FIG. 8.

Figure 9:
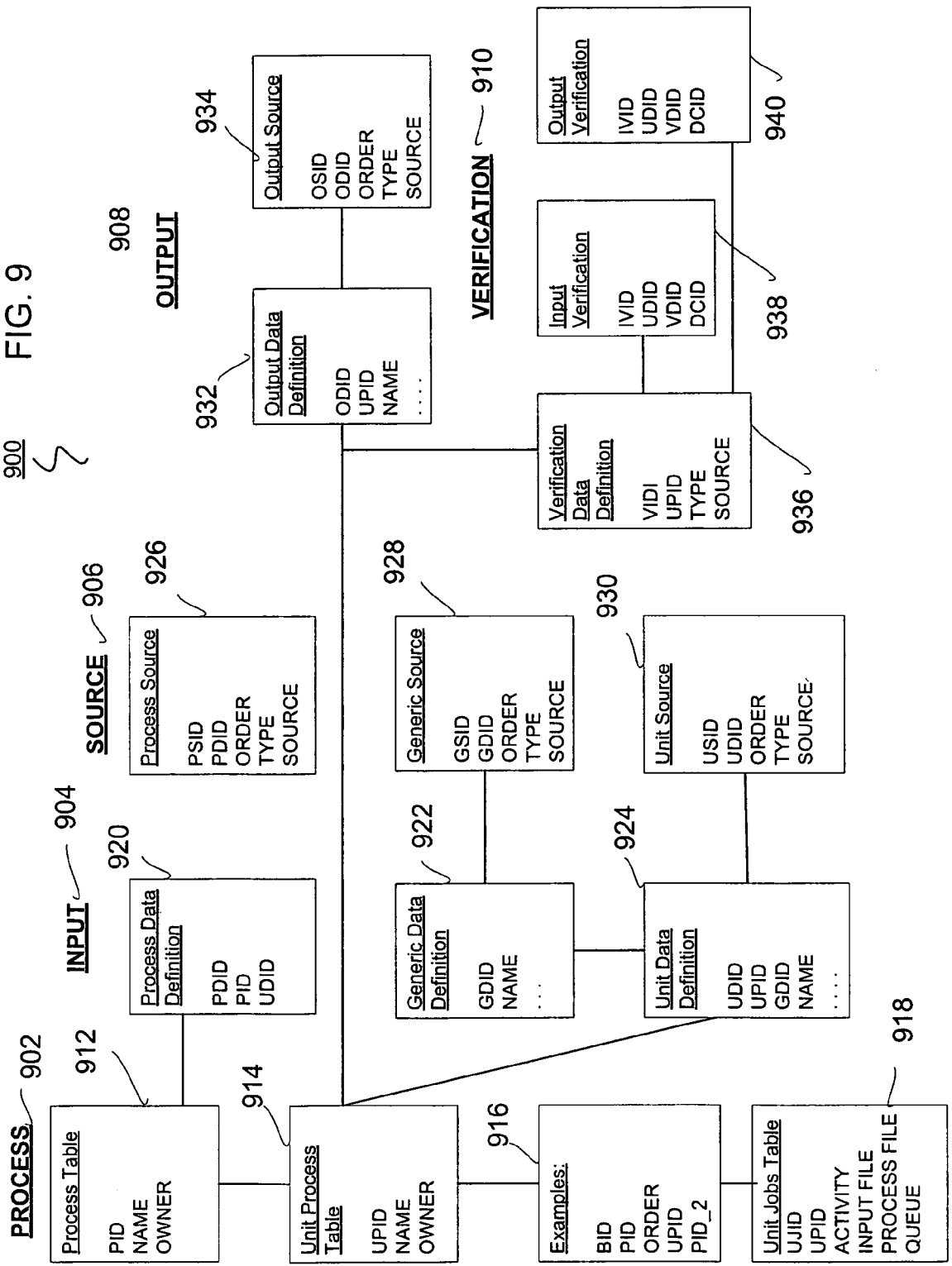
FIG. 9 is a block diagram of a plurality of database tables and processes for an automated reload licensing analysis of a nuclear reactor according to another exemplary embodiment of the invention.

As described above, one or more of the processes, modules, or sub-modules, of the various embodiment of the invention can be implemented in a database such as an Oracle® database. FIG. 9 provides one exemplary block diagram of nuclear reactor licensing analysis database tables 900 according to one embodiment of the invention. As shown in diagram 900, these can include process tables 902, input tables 904, source tables 906, output tables 908, and verification tables 910. The process tables 902 can include process table 912, unit process table 914, process build table 916, and unit jobs table 918. The input table 904 can include process data definition 920, generic data definition 922, and unit data definition 924. The source table 906 can include process source 926, generic source 928, and unit source 930. The output table 908 can include output data definition 932, and output source 934. The verification table 910 can include verification data definition 936, input verification 938, and output verification 940. Various features and data for each of these are shown, by way of example, in FIG. 9. While the exemplary embodiment of FIG. 9 shows the illustrated tables as separate tables, in other embodiments more or fewer tables can be implemented by one skilled in the art.

Figure 10:
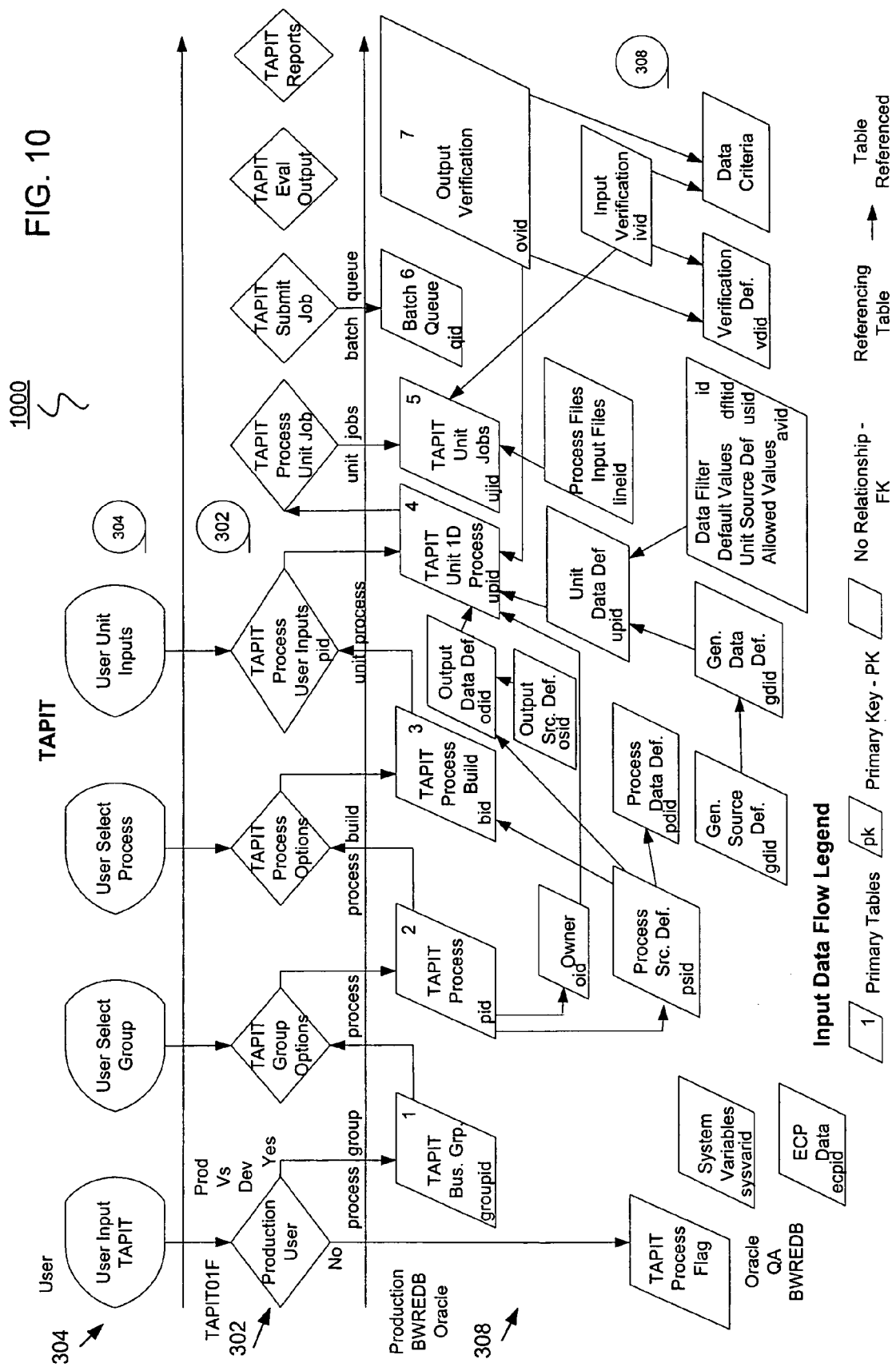
FIG. 10 is a flow chart of a database input data flow according to another exemplary embodiment of the invention.

As noted, the processes herein can be implemented in a computer system and as software as computer readable instructions. Attachment A to this detailed description provides one exemplary hardware and software description consistent with various embodiments of the invention. Additionally, each of these software modules can be described by computer flow charts, for example, as illustrated in FIG. 10, and in the exemplary software description in Attachment B to this detailed description. A flow chart 1000 illustrates a database implemented input data flow for one embodiment of a nuclear reactor licensing analysis method and system according to one embodiment of the invention. As shown, this can include one or more user inputs 302, one or more TAPIT 302 processes, and one or more BWREDB process database processes. The information and detail provided in FIG. 10, Attachment A, and Attachment B are familiar to those skilled in the art.

Referring finally to FIG. 11, an operating environment for an exemplary embodiment of the invention is a computer system 1100 with a computer 1102 that comprises at least one high speed processing unit (CPU) 1108, in conjunction with a memory system 1110, an input device 1104, and an output device 1106. These elements are interconnected by at least one bus structure 1122. These computing elements interact to provide an operating environment for automatically performing reload licensing analysis of a nuclear reactor and generating a reload licensing report according to the various embodiments of the invention.

The illustrated CPU 1108 is of familiar design and includes an arithmetic logic unit (ALU) 1112 for performing computations, a collection of registers 1114 for temporary storage of data and instructions, and a control unit 1116 for controlling operation of the system 1100. Any of a variety of processors, including at least those from Digital Equipment, Sun, MIPS, Motorola, NEC, Intel, Cyrix, AMD, HP, and Nexgen, are equally preferred for the CPU 1108. The illustrated embodiment of the invention operates on an operating system designed to be portable to any of these processing platforms.

The memory system 1110 generally includes high-speed main memory 1118 in the form of a medium such as random access memory (RAM) and read only memory (ROM) semiconductor devices, and secondary storage 1120 in the form of long term storage mediums such as floppy disks, hard disks, tape, CD-ROM, flash memory, etc. and other devices that store data using electrical, magnetic, optical or other recording media. The main memory 1118 also can include video display memory for displaying images through a display device. Those skilled in the art will recognize that the memory system 1110 can comprise a variety of alternative components having a variety of storage capacities.

The input and output devices 1104 and 1106 are familiar to those skilled in the art. The input device 1104 can comprise a keyboard, a mouse, a physical transducer (e.g. a microphone), etc. The output device 1106 can comprise a display, a printer, a transducer (e.g. a speaker), etc. Some devices, such as a network adapter or a modem, can be used as input and/or output devices.

As is familiar to those skilled in the art, the computer system 1100 further includes an operating system and at least one application program. The operating system is the set of software which controls the computer system's operation and the allocation of resources. The application program is the set of software that performs a task desired by the user, using computer resources made available through the operating system. This can include one or more database application programs. Both are resident in the illustrated memory system 1110.

In accordance with the practices of persons skilled in the art of computer programming, the present invention is described below with reference to symbolic representations of operations that are performed by the computer system 1100. Such operations are sometimes referred to as being computer-executed. It will be appreciated that the operations which are symbolically represented include the manipulation by the CPU 1108 of electrical signals representing data bits and the maintenance of data bits at memory locations in the memory system 1110, as well as other processing of signals. The memory locations where data bits are maintained are physical locations that have particular electrical, magnetic, or optical properties corresponding to the data bits. The invention can be implemented in a program or programs, comprising a series of instructions stored on a computer-readable medium. The computer-readable medium can be any of the devices, or a combination of the devices, described above in connection with the memory system 1110.

As addressed above, various embodiments of the invention provide for improved efficiency of the reload licensing process and increased accuracy in the analysis of measurement data by automating the entire fuel reload licensing process with the system and process providing data measurement verification.

One or more embodiments of the invention as described above and in the figures of the various exemplary embodiments can provide for one or more technical effects related to a reduction in the time and resources required to perform a reload licensing analysis and the generation of the reload licensing report. These savings can be considerable for an operator of a nuclear reactor both with regard to the reload licensing process and with reduction in the down time associated with reloading a reactor and bringing the reactor back into operation following the fuel reload. Additionally, some embodiments can provide one or more technical effects related to improved accuracy and effectiveness of the analysis, the output data, and the reload licensing report which can also provide for reduced reactor outage and can provide for improved reactor safety.

While the system and method described herein address the automation of methods and procedures associated with reload analysis and report generation for a nuclear reactor, it should be clear to one skilled in the art that the various embodiments of the invention can also be applied or implemented to a variety of other tasks, methods, and procedures associated with a variety of technologies and industries. For example, the present method and procedure can be implemented with manufacturing, design, operational, regulatory, and engineering methods and systems that utilize analysis programs or modules and that can benefit access to one or more databases or otherwise stored data. As such, the various embodiments can include embodiments related to any field or industry, and is not limited to reactors licensing.

As is known to those skilled in the art, the exemplary embodiments described herein have identified various processes, methods, modules, sub-modules, and functions. It should be understood that fewer or more processes, modules and sub-modules may be implemented and still be within the scope of the invention. Additionally, some modules identified as separate modules herein can be implemented as functions of other modules, and or functions may be implemented as a separate module. The identification of the various modules is only exemplary in nature and is not intended to be limiting.

When introducing aspects of the invention or embodiments thereof, the articles "a", "an", "the", and "said" are intended to mean that there are one or more of the elements. The terms "comprising", "including", and "having" are intended to be inclusive and mean that there may be additional elements other than those listed.

In view of the above, it will be seen that several aspects of the invention are achieved and other advantageous results attained. As various changes could be made in the above exemplary constructions and methods without departing from the scope of the invention, it is intended that all matter contained in the above description or shown in the accompanying drawings shall be interpreted as illustrative and not in a limiting sense.

It is further to be understood that the steps described herein are not to be construed as necessarily requiring their performance in the particular order discussed or illustrated. It is also to be understood that additional or alternative steps may be employed.

What is claimed is:

1. In a computing environment, a computer implemented method of automatically performing reload licensing analysis of a nuclear reactor, the method comprising:
    collecting input data, the input data including system data collected from a data source including at least one of a database file, a spreadsheet file, a stored data text file, and a reactor operator database file;
    processing a plurality of nuclear reactor analysis modules, each of the plurality of nuclear reactor analysis modules receiving analysis module input data and generating analysis output data, said analysis module input data based at least in part on the collected input data;
    verifying at least one analysis output data from one of the plurality of nuclear reactor analysis modules by comparing the analysis output data to independently-determined analysis output data for the one nuclear reactor analysis module; and
    generating a reload licensing report for the nuclear reactor as a function of the analysis output data from two or more of the plurality of nuclear reactor analysis modules.

2. The method of claim 1, wherein verifying includes verifying the analysis output data from each nuclear reactor analysis module and wherein at least a portion of the nuclear reactor analysis modules receive analysis module input data that includes verified analysis output data generated by another nuclear reactor analysis module.

3. The method of claim 1, wherein one of the nuclear reactor analysis modules is a user input verification module, further comprising validating an integrity of the input data collected from a user.

4. The method of claim 1, further comprising validating the analysis module input data received by each nuclear reactor analysis module by comparing the received analysis module input data to a independently-determined analysis module input data.

5. The method of claim 4, wherein the independently-determined analysis module input data is data associated with a prior processing of the associated nuclear reactor analysis module.

6. The method of claim 1, further comprising scheduling the nuclear reactor analysis modules such that the nuclear reactor analysis modules are processed sequentially, simultaneously, or a combination thereof.

7. The method of claim 6, wherein the processing of the nuclear reactor analysis modules is instruction driven.

8. The method of claim 1, further comprising receiving an operator command to initiate the reload licensing analysis of the nuclear reactor, wherein the processing, verifying and generating are automatically performed without further operator input or interaction.

9. The method of claim 1, wherein the nuclear reactor analysis modules include a nuclear design basis (NDB) sub-module, a reload core coolant hydraulics sub-module, a reference loading pattern (RLP) sub-module, safety limit minimum critical power ratio (SLMCPR) sub-module, a reload transient analysis (RTA) sub-module, a rod withdrawal error (RWE) sub-module, loss of feedwater heating (LFWH) sub-module, a mislocated fuel loading error (MFLE) sub-module, a stability analysis sub-module, and an emergency core coolant system conformance limit analysis (ECCS LOCA) sub-module.

10. The method of claim 9, further comprising generating an operating limit minimum critical power ratio (OLMCPR) as a function of outputs generated by the RTA, RWE, LFWH, MFLE, ECCS LOCA and stability analysis sub-modules, wherein generating the reload licensing report is a function, at least in part, of the operating limit minimum critical power ratio (OLMCPR).

11. A system for automatically performing reload licensing analysis of a nuclear reactor, the system comprising:
    a processor;
    at least one memory storing at least one database; and
    a software program including an input data collection module, an input data verification module, a plurality of nuclear reactor analysis modules, a process module, and a reload licensing report generation module; said input data collection module configured to receive input data, said input data collection module with a user data interface sub-module configured to receive operator input and a system data collection sub-module configured to collect data from one or more data sources; said input data verification module configured to compare the received input data to predefined input verification data; said process module for processing each of the plurality of nuclear reactor analysis modules and generating module output data; said process module including a process ordering sub-module configured to initiate automatic processing of each nuclear reactor analysis module; said reload licensing report generation module configured to generate a reload licensing report for the nuclear reactor as a function of the module output data from two or more of the plurality of nuclear reactor analysis modules.

12. The system of claim 11, wherein the process ordering sub-module is adapted to initiate automatic processing of the nuclear reactor analysis modules sequentially, simultaneously, or a combination thereof.

13. The system of claim 11, further comprising a process history module for storing data associated with the processing of the nuclear reactor analysis modules by the process module.

14. The system of claim 11, wherein each nuclear reactor analysis module is configured to receive module input data and generate module output data, and wherein two or more nuclear reactor analysis modules provide their module output data to two or more other nuclear reactor analysis modules as module input data.

15. The system of claim 11, wherein each nuclear reactor analysis module includes a received data verification sub-module configured to compare the received module input data to independently-determined module input data associated with that particular nuclear reactor analysis module.

16. The system of claim 11, wherein each nuclear reactor analysis module includes a module analysis output data verification sub-module configured to compare preliminary module analysis output data to independently-determined analysis output data associated with that particular nuclear reactor analysis module prior to generating the module analysis output data.

17. The system of claim 11, wherein the input data collection module receives data selected from the group consisting of fuel reload licensing engineering data (FRED), a plant transient specification, plant operating data, fuel bundle data, mechanical data, nuclear data, thermal-hydraulic data, preliminary core design data, and general plant data.

18. The system of claim 11, wherein the nuclear reactor analysis module includes two or more sub-modules selected from the group consisting of a nuclear design basis (NDB) sub-module, a reload core coolant hydraulics sub-module, a reference loading pattern (RLP) sub-module, safety limit minimum critical power ratio (SLMCPR) sub-module, a reload transient analysis (RTA) sub-module, a rod withdrawal error (RWE) sub-module, loss of feedwater heating (LFWH) sub-module, a mislocated fuel loading error (MFLE) sub-module, a stability analysis sub-module, and an emergency core coolant system conformance limit analysis (ECCS LOCA) sub-module.

19. The system of claim 11, further comprising a design and licensing criteria verification data module that includes at least one of nuclear reactor analysis options, nuclear reactor operator operational goals, objectives, and criteria, and nuclear reactor design requirements.

20. The system of claim 11, further comprising generating a supplemental reload licensing report as a function of module output data from at least one of the nuclear reactor analysis modules.

21. The system of claim 11, wherein the process module receives an operator command to initiate the reload licensing analysis of the nuclear reactor and thereafter automatically initiates and processes each of the nuclear reactor analysis modules without further operator input or interaction.

22. The system of claim 11, wherein the process module for processing the nuclear reactor analysis modules is configured to be instruction driven.

23. A computer readable medium storing instruction that when executed cause a computer to execute instructions for a method of automated reload licensing analysis of a nuclear reactor, the method comprising:

collecting system input data;

scheduling a plurality of nuclear reactor analysis modules;

processing each of the plurality of nuclear reactor analysis modules as a function of the scheduling, each nuclear reactor analysis module receiving module input data and generating module output data;

verifying the module output data of each nuclear reactor analysis module by comparing the generated analysis output data to independently-determined analysis output data for the particular nuclear reactor analysis module, wherein at least a portion of the plurality of nuclear reactor analysis modules receive verified module output data from another of the plurality of nuclear reactor analysis modules as module input data; and generating a reload licensing report for the nuclear reactor as a function of the verified module output data from two or more of the plurality of nuclear reactor analysis modules.

* * * * *